(12) United States Patent
Chrysos et al.

(10) Patent No.: US 7,003,648 B2
(45) Date of Patent: Feb. 21, 2006

(54) FLEXIBLE DEMAND-BASED RESOURCE ALLOCATION FOR MULTIPLE REQUESTORS IN A SIMULTANEOUS MULTI-THREADED CPU

(75) Inventors: George Z. Chrysos, Milford, MA (US); Chuan-Hua Chang, Natick, MA (US); Joel S. Emer, Acton, MA (US); John H. Mylius, Framingham, MA (US); Peter Soderquist, Framingham, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 429 days.

(21) Appl. No.: 10/109,255

(22) Filed: Mar. 28, 2002

(65) Prior Publication Data

US 2003/0188139 A1 Oct. 2, 2003

(51) Int. Cl.
*G06F 15/82* (2006.01)
*G06F 15/163* (2006.01)

(52) U.S. Cl. .......................................... 712/26; 712/27
(58) Field of Classification Search ................. 712/25, 712/26, 225, 27
See application file for complete search history.

(56) References Cited

U.S. PATENT DOCUMENTS

| 6,112,019 A * | 8/2000 | Chamdani et al. | 712/214 |
| 6,481,251 B1 * | 11/2002 | Meier et al. | 70/52 |
| 6,738,896 B1 * | 5/2004 | Webb et al. | 712/214 |

\* cited by examiner

*Primary Examiner*—Daniel Pan

(57) ABSTRACT

A multi-threaded processor provides for efficient flow-control from a pool of un-executed stores in an instruction queue to a store queue. The processor also includes similar capabilities with respect to load instructions. The processor includes logic organized into a plurality of thread processing units ("TPUs") and allocation logic that monitors each TPUs demand for entries in the store queue. Demand is determined by subtracting an adjustable threshold value from the most recently assigned store identifier value. If the difference between the most recently assigned instruction identifier for a TPU and the TPU's threshold is non-zero, then it is determined that the TPU has demand for at least one entry in the store queue. The allocation logic includes arbitration logic that determines which one of a plurality of TPUs with store queue demand should be allocated a free entry in the store queue.

32 Claims, 1 Drawing Sheet

FLEXIBLE DEMAND-BASED RESOURCE ALLOCATION FOR MULTIPLE REQUESTORS IN A SIMULTANEOUS MULTI-THREADED CPU

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to allocating resources within a microprocessor. More particularly, the invention relates to managing load and store queues in a simultaneous multi-threaded processor. Still more particularly, the invention relates to dynamically allocating entries in load and store queues to more efficiently use the resources contained within the processor.

2. Background Information

All computers have a device called a "microprocessor." A microprocessor, or simply "processor," comprises the logic, typically a semiconductor device, which executes software. Microprocessors fetch software instructions from memory and execute them. Each instruction generally undergoes several stages of processing. For example, the instruction is fetched and decoded to determine the type of instruction (load, store, add, multiply, etc.). Then, the instruction is scheduled, executed and eventually retired. Each stage of processing may require multiple clock cycles. It has been recognized that the next instruction to be executed by a processor can be fetched and entered into the processor's pipeline before the previous instruction is retired. Thus, some processors are designed with pipelined architectures to permit multiple instructions to be at various stages of processing at any one point in time. An instruction that is in the pipeline, but not yet retired, is said to be "in flight."

A microprocessor includes a number of internal resources that it uses to process and execute the instructions. The preferred embodiments of the invention described below are directed to utilizing those resources more efficiently. More specifically, the preferred embodiments are directed to techniques for managing load and store queues in the processor. A load queue is a buffer into which load instructions are stored pending retirement. A load instruction causes data to be retrieved from memory. A store queue is a buffer into which store instructions are kept pending until their impact can be committed to machine state. A store instruction causes data to be written to memory. Typically, store and load queues have a limited number of entries into which store and load instructions can be written. The number of entries typically is less than the total number of store and load instructions that may be in-flight at any given time.

Some processors are referred to as simultaneous "multi-threaded" processors which means they can execute in multiple threads of software simultaneously. Some processors include thread processing units ("TPUs"). A TPU is hardware in the processor that creates the capability of running a process by holding the state of the running process, primarily its program counter ("PC") and registers. A processor that can hold enough information state for four TPUs, for example, can run four processes on the same set of functional units, instruction queue, caches, etc.

In many previous processor designs, entries in the load and store queues were pre-allocated to each of the TPUs. Although generally satisfactory, the following problem arises. On one hand, a TPU will operate sub-optimally if the TPU actually needs more store/load queue entries than it was allocated. On the other hand, a TPU may not need all of the load/store queue entries it was allocated. Accordingly, there are situations in which a scheme which pre-allocates processor resources will be operating in a non-optimal fashion. As such, a scheme is needed that allocates the load and store queue entries to ensure more efficient use of the queues.

BRIEF SUMMARY OF THE PREFERRED EMBODIMENTS OF THE INVENTION

The problems noted above are solved in large part by a multi-threaded processor that provides efficient allocation of processor resources. In general, instructions are stored in a first storage area and subsequently written to a second storage area when space in the second storage area is made available. To that end, allocation logic causes space in the second storage area to be freed up based on demand for the space. The demand is repeatedly updated during processor operation.

In one embodiment, the instructions may be store (and/or load) instructions and the processor provides for efficient flow-control from a pool of un-executed stores in an instruction queue to a store queue. The processor also includes similar capabilities with respect to load instructions. The processor includes logic organized into a plurality of thread processing units ("TPUs"). The processor also includes allocation logic that monitors the demand by each TPU of entries in the store queue. Stores are allowed to execute only when they have a guaranteed store queue entry reserved for them. For the load queue and store queue each TPU has an adjustable high water mark ("HWM") associated with it that corresponds to the youngest load or store instruction associated with the TPU that has been allocated space in the load or store queue.

The relative age of store instructions can be determined by comparing an "SNUM" assigned to the stores. The SNUM is a unique instruction identifier assigned to each store by SNUM allocation logic. If the difference between the most recently assigned SNUM for a TPU and the TPU's HWM is non-zero, then the allocation logic determines that the TPU has demand for at least one entry in the store queue. The allocation logic includes arbitration logic that determines which one of a plurality of TPUs with store queue demand should be allocated a free entry in the store queue. The arbitration decision can be in accordance with a round robin or other approach.

A TPU's HWM is increased when a store queue entry is freed and the arbitration logic has reallocated the entry to the TPU. Store queue entries free after the stores they contain have retired and been permitted to write their data to memory. When a store queue entry is freed, information is sent to the store queue allocation mechanism, which then reallocates the entry by increasing the HWM for one of the TPUs, thus allowing another store to gain eligibility for execution. A similar process can also be implemented for load instructions relative to a load queue.

In accordance with one embodiment of the invention, the processor includes an allocation unit that assigns identifier numbers to instructions, the instructions selected from the group consisting of load instructions and store instructions, an instruction queue into which said instructions are stored, said instruction queue coupled to said allocation unit, a second queue into which instructions from said instruction queue are written after execution and pending retirement, the second queue having a plurality of entries for storing instructions and their identifier numbers, and allocation logic that causes entries in the second queue to be allocated to instructions from the instruction queue based on the demand for said entries associated with said threads, said demand updated during processor operation. Rather than instructions being written into the second queue, values (e.g., pointers, instruction numbers, etc.) indicative of the location of the instructions can be written into second queue.

Thus, the store or load queues are efficiently allocated to TPU instructions that have demand for the queues and TPUs that have no demand do not needlessly tie up valuable load/store queue entries. These and other advantages will become apparent upon reviewing the following description.

BRIEF DESCRIPTION OF THE DRAWINGS

For a detailed description of the preferred embodiments of the invention, reference will now be made to the accompanying drawings in which.

NOTATION AND NOMENCLATURE

Figure 1:
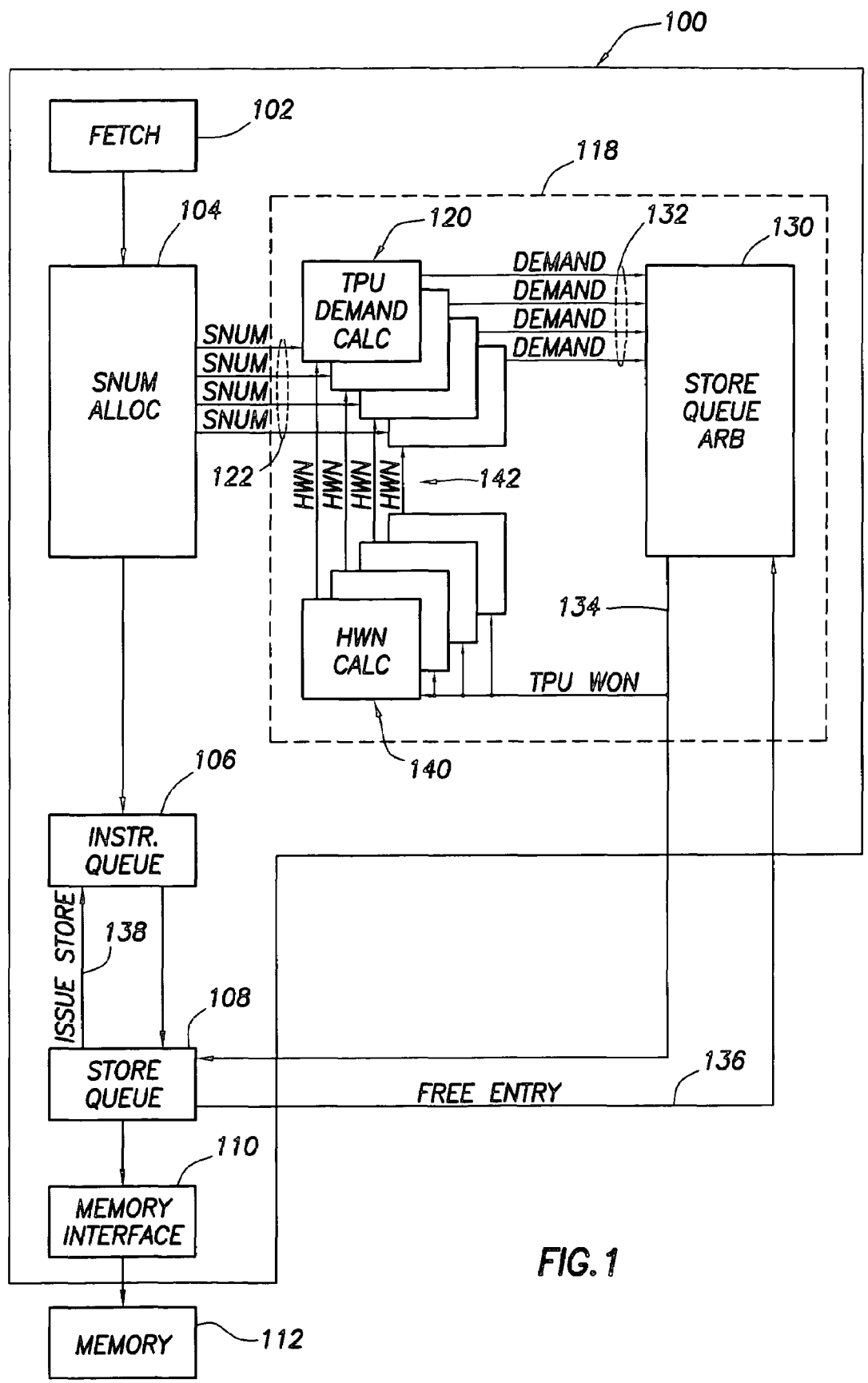
FIG. 1 shows a block diagram of a processor in accordance with the preferred embodiment of the invention.

Certain terms are used throughout the following description and claims to refer to particular system components. As one skilled in the art will appreciate, computer companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections. To the extent that any term is not specially defined in this specification, the intent is that the term is to be given its plain and ordinary meaning.

DETAILED DESCRIPTION OF THE PREFERRED EMBODIMENTS

Referring now to FIG. 1, in accordance with the preferred embodiment of the invention, processor 100 includes fetch logic 102, SNUM allocation logic 104, an instruction queue 106, a store queue, and a memory interface 110. The processor 100 may be coupled to external memory 112 through the memory interface 110. It should be recognized that processor 100 may have, and preferably does have, other components which have been omitted for sake of clarity in explaining the preferred embodiment of the invention. For example, the processor 100 may include internal cache memory and interfaces to other processors.

The preferred embodiment shown in FIG. 1 is shown so that the allocation of store queue resources can be understood. The principles and algorithms discussed below can be extended to the allocation of load instruction resources. For sake of simplicity, FIG. 1 does not show some of the components, such as an LNUM allocation logic and a load queue, that are included with regard to processing load instructions. FIG. 1 will be described below in the context of store instructions. Afterwards, application of these principles to load instructions will be discussed.

Referring still to FIG. 1, the fetch logic 102 fetches instructions to be executed from memory. The fetch logic may include branch prediction logic, decode logic to determine the type of instruction (load, store, add, multiply, etc.), program counters and other known components. After an instruction is fetched and decoded, the SNUM allocation logic 104 assigns an "SNUM" to the instruction if the instruction is a store. Preferably, for each TPU, each in-flight store receives a unique SNUM from the SNUM allocation logic 104. Broadly, an SNUM is a label that is assigned to a store as it is mapped within the processor 100. In accordance with the preferred embodiment, the SNUM label is an integer value greater than or equal to 0. Also, the SNUM allocation logic assigns SNUM values in sequential order meaning that the first store instruction received is given the initial SNUM value (e.g., 0), the next store is given the next integer in order (e.g., 1), the next store's SNUM will be the next integer (e.g., 2), and so on. In this manner, the relative age of two un-retired stores can be determined by comparing their SNUM labels.

Instructions that have been fetched are stored in the instruction queue 106 pending execution. Store instructions are stored in the instruction queue with the SNUMs assigned to them by the SNUM allocation logic 104. Once the stores are ready to be executed, they are written into the store queue 108 and from there, they are executed, retired, and written to memory. A store instruction uses the memory interface to write its data to memory 112 which may be external to the processor 100. Other types of instructions, such as adds, multiplies, and so on, use other execution units within the processor. Such other units, however, have been omitted for sake of clarity in understanding the store queue allocation scheme of the preferred embodiment.

As noted above, stores from the instruction queue 106 are sent to the store queue 108. The store queue, however, generally does not have enough entries to accommodate all stores currently in the instruction queue. Accordingly, a decision is made as to which and when various stores from the instruction queue should be provided to the store queue. As will be described below, the preferred allocation scheme described herein uses another value called the "high water mark" ("HWM"). Each TPU has its own HWM. The HWM is a value that represents the youngest SNUM that is currently allowed to issue from the instruction queue 106 to the store queue 108. Preferably, all stores that are older than, or equal to, the HWM are guaranteed to have an allocated entry in the store queue 108 and thus can issue when their input values have been calculated.

The preferred store queue allocation scheme is based on the demand by each TPU for entries in the store queue 108. The demand per TPU preferably is determined by subtracting the TPU's HWM from its most recently assigned SNUM. For example, if the most recently assigned SNUM is 12 and the TPU's HWM is 9, then that TPU has a demand of 12−9 or 3. That is, the TPU has three stores that could be, but have not been, allocated entries in the store queue 108. If the difference between the most recently assigned SNUM and the HWM is a non-zero value, then it is known that the TPU does, in fact, have a demand for entries in the store queue 108. Then, when a store queue entry becomes free, that entry can be allocated to the TPU that has a demand for an entry. When a store queue entry is allocated to a TPU store instruction, the HWM associated with that TPU is incremented by an amount corresponding to the number of stores being allocated entries in the store queue 108. For example, if one store is allocated a store queue entry, then the HWM is incremented by one. If the TPU has only one store needing an entry in the store queue, then when that store is allocated an entry, the HWM is incremented by one and the HWM will equal to the most recently assigned SNUM. At that point, the TPU will have zero demand for store queue entries and, accordingly, no more entries will be allocated to that TPU until the TPU again has d4emand (i.e., by receiving a new store and allocating a new SNUM to that store).

If the processor has multiple TPUs, the processor can include logic that calculates the store queue demand for each TPU and allocates store queue entries to one of the TPUs. The decision as to which TPU among multiple TPUs having demand for store queue entries can be made in accordance with any suitable scheme. For example, a round robin protocol can be implemented in which the TPUs are rotated in terms in terms of store queue allocation. If, for example, the processor has four TPUs and all four TPUs continuously have demand for store entries, then each TPU in turn will be allocated one or more entries from the store queue. In this way, no TPU is "starved" from being allocated store queue entries and at the same, a TPU without store queue demand does not tie up store entries that could be used by other TPUs having demand.

Referring still to FIG. 1, an exemplary embodiment of allocation logic 118 is shown to implement the store queue allocation scheme described above. The allocation logic 118 includes a TPU demand calculation unit 120 for each TPU, a store queue arbitration unit 130, and a HWM calculation unit 140 for each TPU. The exemplary embodiment of FIG. 1 assumes the presence of four TPUs and there are four TPU demand calculation and HWM calculation units 120 and 140.

Each TPU demand calculation unit 120 receives an SNUM signal 122 from the SNUM allocation unit 104 when the allocation unit assigns a new SNUM to a store associated with a TPU. The TPU demand calculation units 120 thus are provided with a value indicative of the most recently assigned SNUM for each TPU. Alternatively, rather than transmitting the actual SNUM value to the TPU demand calculation unit 120, the SNUM allocation unit 104 could simply toggle signal 122 to indicate that a new SNUM value has been assigned to a store and the TPU demand calculation unit 120 could keep track of the actual SNUM value.

Each TPU demand calculation unit 120 also receives a HWM value from a corresponding HWM calculation unit 140 on signal 142. Each TPU demand calculation unit 120 generates a demand signal 132 that specifies, or is indicative of, the demand for store queue entries for the associated TPU. Each TPU demand calculation unit 120 generates its demand output signal by subtracting the TPU's HWM (received from the HWM calculation unit 14) from the most recently assigned SNUM (received from the SNUM allocation logic 104).

The store queue arbitration unit 130 receives the demand signals 132 from the various TPU demand calculation units 120 and when an entry becomes free in the store queue 108 as encoded in the Free Entry signal 136, makes an arbitration decision as to which TPU should be allocated entries in the store queue 108. The store queue arbitration unit 130 examines the demand signals 132 to determine which, if any, TPUs have demand for store queue entries. If no TPUs have demand, then of course, no entries are allocated. If only TPU has demand during the arbitration process, then that one TPU is allocated and entry. If more than one TPU has demand, then in accordance with the round robin scheme described above, the store queue arbitration unit 130 causes the next free store queue entry to be allocated to the next TPU in turn (i.e., the TPU that least recently was allocated a store queue entry). When store queue arbitration logic 130 determines which TPU has won an arbitration cycle, it asserts a TPU won signal 134 which indicates the winning TPU. The TPU won signal may be a single signal that encodes which TPU won the arbitration. Alternatively, a separate TPU won signal could be provided corresponding to each TPU that asserts if the corresponding TPU won arbitration. The TPU won signal 134 is provided to the HWM calculation units 140 so that the HWM associated with the winning TPU can be incremented as described above.

The TPU won signal 134 also is provided to the store queue 108. The store queue responds to the TPU won signal 134 by modifying the free entry to accommodate a new store instruction from the instruction queue 106. Each entry in the store queue 108 provides storage for a storage instruction as well as the SNUM of the store instruction and one or more retire bits that indicate whether the store has been retired. Note that stores remain in the store queue after retirement until they are written to memory. Other information can be stored in the entry as well such as the TPU ID identifying the TPU associated with the store and the HWM of that TPU. The store queue 108 allocates the entry to a new store by writing the SNUM for the store into the free entry. The SNUM can be provided to the store queue 108 in accordance with any suitable mechanism. For example, the SNUM can be encoded into the TPU won signal 134 asserted by the store queue arbitration logic 130 or can be provided in a signal separate from the TPU won signal from the store queue arbitration logic, the TPU demand calculation logic 120 or HWM calculation logic 140.

In accordance with the preferred embodiment of the invention, when the store queue 108 prepares an entry for a new store instruction, the store queue asserts an Issue Store signal 138 to the instruction queue 106 which informs the instruction queue 106 that an entry has become available. The Issue Store signal 138 preferably also includes the TPU ID of the TPU that won arbitration. The instruction queue 106 responds by releasing a store instruction corresponding to the winning TPU to the store queue 108. When the corresponding store issues, it is sent to the store queue along with its SNUM. The SNUM is compared to the contents of the store queue 108 to find the corresponding entry. This comparison preferably is implemented using well known content addressable memory ("CAM") in the store queue. The SNUM is thus CAM'd against the store queue to find an entry with a matching SNUM.

It is also preferable to ensure that the CAM'ing operation does not hit on a store queue entry that includes a store that has been retired. To that end, the CAMing operation also CAMs against the retire bits in the store queue entries. Accordingly, even if two entries in the store queue have the same SNUM, only the correct SNUM is recognized by the CAMing operation by the absence of its retire bits being set.

Thus, the preferred embodiments described above provides efficient flow-control from the pool of un-executed stores in the instruction 106 to the store queue 108. Stores are allowed to execute only when they have a guaranteed store queue entry reserved for them. The high water mark ("HWM") is increased when a store queue entry is freed and reallocated to a particular TPU. Store queue entries free after the stores they contain have retired and been permitted to write their data to memory 112. When a store queue entry is freed, information is sent to the store queue allocation mechanism, when then reallocates the entry by increasing the HWM for one of the TPUs, thus allowing another store to gain eligibility for execution.

Processor 100 may have logic that permits instructions to be fetched and processed through the processor speculatively. For example, the fetch unit 102 may include branch prediction logic which predicts the outcome of conditional branch instructions prior to the actual execution of the branch. Then, instructions on the predicted branch path are fetched and begin moving their way through the processor's pipeline. The branch prediction algorithm preferably is such that it accurately predicts branch instructions a relatively high percentage of the time. If, however, the prediction proves to be wrong (a branch "misprediction"), then the instructions that were fetched and processed in the processor should be "flushed" meaning they should be eradicated from the processor and the instructions on the correct branch path should now be fetched.

Flushing the incorrect instructions typically requires involvement in a number of different areas of the processor. Relative the store queue allocation scheme discussed herein, all incorrect store instructions should be removed (or "killed") from the instruction queue 106 and the store queue 108. Thus, the store queue allocation scheme should facilitate reclaiming store queue entries that have been killed. Upon a kill, the SNUM allocation logic 104 preferably resets the SNUM that is next to be allocated to a store to the same SNUM as the first SNUM that was allocated to the "bad" path (e.g., the mispredicted and fetched set of instructions). In addition, the HWM in the TPU of the bad path may also be reset in the event of a kill. In doing this, the allocated entries in the store queue that are on the bad path are freed and can be reassigned. The setting of the HWM on a kill may depend on whether the kill point is before or after the current HWM. If the kill point is younger than the HWM, that is, no stores on the bad path have yet been allocated, it is left as its current value. On the other hand, if the kill point is older than the current HWM, then the HWM is set to the last good allocated SNUM.

The store queue 106 may also return the killed store queue entries to the free pool. It does this by comparing each entry's SNUM with the modified HWM driven by the SNUM allocation logic 104. Those entries that are not retired and have an SNUM that is younger than the HWM are marked as free.

Each store queue entry includes capacity to accommodate one or more stores. In one embodiment, for example, each entry contains four stores. Accordingly, increasing the HWM as explained above actually graduates another four stores into execution eligibility.

The above discussion pertained to more efficiently allocating store instruction resources in the store queue 108. The allocation scheme is also applicable to load instructions. Accordingly, the block diagram of FIG. 1 and the discussion above relative to FIG. 1 is directly applicable to loads. The difference would be that instead of SNUMs being allocated to by the SNUM allocation logic 104, "LNUMs" (load instruction numbers) are allocated by LNUM allocation logic to load instructions. Further, allocation of entries in a load queue is performed by allocation logic in a load queue instead of store queue 108. Such allocation logic includes load queue arbitration logic instead of store queue arbitration logic and TPU demand calculation and HWM calculation logic associated with load instruction.

It should be recognized that the processor described herein can be used in a computer and that other components would be included in the computer and coupled to the processor. For example, the computer would normally have an input device such as a mouse or keyboard and an output device such as display.

The above discussion is meant to be illustrative of the principles and various embodiments of the present invention. Numerous variations and modifications will become apparent to those skilled in the art once the above disclosure is fully appreciated. Components can be added or removed from the circuits and different circuits altogether that provide the same benefits and functionality can be used. It is intended that the following claims be interpreted to embrace all such variations and modifications.

What is claimed is:

1. A multi-threaded processor, comprising:
  an allocation unit that assigns identifier numbers to instructions, said instructions selected from a group consisting of load instructions and store instructions;
  an instruction queue into which said instructions are stored, said instruction queue coupled to said allocation unit;
  a second queue into which instructions from said instruction queue are written after execution and pending retirement, said second queue having a plurality of entries for storing instructions and their identifier numbers:
  a plurality of thread processing units ("TPUs"); and
  allocation logic coupled to the TPUs, the allocation logic causes entries in the second queue to be allocated to instructions from the instruction queue based on a demand for said entries by each of the TPUs, said demand updated during processor operation.

2. The processor of claim 1 wherein said allocation logic comprises a demand calculation unit associated with each TPU and coupled to said allocation unit, said demand calculation unit calculating the demand for entries in the second queue.

3. The processor of claim 2 wherein said allocation unit provides an indication of the most recently assigned instruction number for each TPU to the associated demand calculation unit and the demand calculation unit calculates the demand using the most recently assigned instruction number.

4. The processor of claim 3 wherein said allocation logic also includes a high water mark calculation unit associated with each TPU and coupled to a demand calculation unit also associated with the TPU, each high water mark calculation unit providing a high water mark value to the associated demand calculation unit, said high water mark value indicative of the most recently received instruction associated with a TPU that is allowed to issue from the instruction queue to the second queue.

5. The processor of claim 4 wherein said allocation logic also comprises queue arbitration logic coupled to said demand calculation logic, high water mark calculation logic and said second queue, said queue arbitration logic determines, among those TPUs having demand, which TPU should be allocated entries in the second queue.

6. The processor of claim 5 wherein said second queue provides information to said queue arbitration logic to indicate whether the second queue has any free entries.

7. The processor of claim 5 wherein said arbitration logic implements a round robin arbitration protocol among those TPUs that have demand for second queue entries.

8. A computer system, comprising:
an input device; and
a processor coupled to said and receiving input signals from said input device, said processor Including:
an allocation unit that assigns identifier numbers to instructions, said instructions selected from a group consisting of load instructions and store instructions;
an instruction queue into which said instructions are stored, said instruction queue coupled to said allocation unit;
a second queue into which instructions from said instruction queue are written after execution and pending retirement, said second queue having a plurality of entries for storing instructions and their identifier numbers; and
allocation logic that allocates entries in the second queue to instructions from the instruction queue based on a demand for said entries by at least one thread processing unit ("TPU"), said demand updated during processor operation.

9. The processor of claim 8 wherein said allocation logic comprises a demand calculation unit associated with each TPU and coupled to said allocation unit, said demand calculation unit calculating the demand for entries in the second queue.

10. The processor of claim 9 wherein said allocation unit provides an indication of the most recently assigned instruction number for each TPU to the associated demand calculation unit and the demand calculation unit calculates the demand using the most recently assigned instruction number.

11. The processor of claim 10 wherein said allocation logic also includes a high water mark calculation unit associated with each TPU and coupled to a demand calculation unit also associated with the TPU, each high water mark calculation unit providing a high water mark value to the associated demand calculation unit, said high water mark value indicative of the most recently received instruction associated with a TPU that is allowed to issue from the instruction queue to the second queue.

12. The processor of claim 11 wherein said allocation logic also comprises queue arbitration logic coupled to said demand calculation logic, high water mark calculation logic and said second queue, said queue arbitration logic determines, among those TPUs having demand, which TPU should be allocated entries in the second queue.

13. The processor of claim 12 wherein said second queue provides information to said queue arbitration logic to indicate whether the second queue has any free entries.

14. The processor of claim 12 wherein said arbitration logic implements a round robin arbitration protocol among those TPUs that have demand for second queue entries.

15. A multithreaded processor having logic organized as a plurality of thread processing units ("TPUs"), each TPU capable of running a process, said processor comprising:
a store number ("SNUM") allocation unit which assigns SNUMs to store instructions in each of a plurality of TPUs, an SNUM comprising a unique value assigned to each store instruction in a TPU, and each TPU having its own set of unique SNUMs;
an instruction queue coupled to said SNUM allocation unit, and store instructions are stored in said instruction queue;
a multi-entry store queue into which a store instruction associated with a TPU is sent from said instruction queue when an entry is allocated to the TPU;
allocation logic coupled to said SNUM allocation unit and said store queue, said allocation logic determining whether each TPU has a need for entries in the store queue for store instructions associated with the TPU currently being held in the instruction queue by comparing the most recently assigned SNUM for each TPU to an adjustable threshold value.

16. The processor of claim 15 wherein said allocation logic compares the most recently assigned SNUM for each TPU to an adjustable threshold value by subtracting the threshold value from the most recently assigned SNUM and determining that the TPU has demand if the result of the subtraction is not zero.

17. The processor of claim 15 wherein the allocation logic receives a free entry signal from the store queue indicating that an entry is free in the store queue and the allocation logic selects a TPU for allocating the entry if a TPU has demand for the entry.

18. The processor of claim 17 wherein if multiple TPUs have demand, the allocation logic selects the TPU to which to allocate a free store queue entry in accordance with a round robin scheme.

19. The processor of claim 15 wherein said allocation logic adjusts the threshold value for the TPU that is selected to be allocated the free entry.

20. The processor of claim 15 wherein said allocation logic increases the threshold value for the TPU that is selected to be allocated the free entry.

21. A multithreaded processor having logic organized as a plurality of thread processing units ("TPUs"), each TPU capable of running a process, said processor comprising:
a load number ("LNUM") allocation unit which assigns LNUMs to load instructions in each of a plurality of TPUs, an LNUM comprising a unique value assigned to each load instruction in a TPU, and each TPU having its own set of unique LNUMs;
an instruction queue coupled to said LNUM allocation unit, and load instructions are stored in said instruction queue;
a multi-entry load queue into which a load instruction associated with a TPU is sent from said instruction queue when an entry is allocated to the TPU;
allocation logic coupled to said LNUM allocation unit and said load queue, said allocation logic determining whether each TPU has a need for entries in the load queue for load instructions associated with the TPU currently being held in the instruction queue by comparing the most recently assigned LNUM for each TPU to an adjustable threshold value.

22. The processor of claim 21 wherein said allocation logic compares the most recently assigned LNUM for each TPU to an adjustable threshold value by subtracting the threshold value from the most recently assigned LNUM and determining that the TPU has demand if the result of the subtraction is not zero.

23. The processor of claim 21 wherein the allocation logic receives a tree entry signal from the load queue indicating that an entry is free in the load queue and the allocation logic selects a TPU for allocating the entry if a TPU has demand for the entry.

24. The processor of claim 23 wherein if multiple TPUs have demand, the allocation logic selects the TPU to which to allocate a free load queue entry in accordance with a round robin scheme.

25. The processor of claim 21 wherein said allocation logic adjusts the threshold value for the TPU that is selected to be allocated the free entry.

26. The processor of claim 21 wherein said allocation logic increases the threshold value for the TPU that is selected to be allocated the free entry.

27. A method of dynamically allocating resources in a multithreaded processor implementing a plurality of thread processor units ("TPUs"), each TPU capable of running a process, said method comprising:
   determining a demand for a processor resource on behalf of each TPU, wherein said determining a demand includes comparing an instruction identifier value to a high water mark value for each TPU, said high water mark value representing the youngest instruction in the processor that is allowed to issue;
   determining whether the resource is available to be allocated to a TPU;
   if multiple TPUs have demand for the resource, arbitrating among the TPUs for allocation of the resource; and
   allocating the resource to the winner of said arbitration.

28. The method of claim 27 wherein said resource comprises a queue into which instructions are stored, said instructions selected from the group consisting of load instructions and store instructions.

29. The method of claim 28 wherein said arbitrating is performed in accordance with a round robin protocol.

30. A processor, comprising:
   an allocation unit that assigns identifier numbers to instructions, said instructions selected from a group consisting of load instructions and store instructions;
   an instruction queue into which said instructions are stored, said instruction queue coupled to said allocation unit;
   a second queue into which instructions from said instruction queue are written pending execution, said second queue having a plurality of entries for storing instructions and their identifier numbers; and
   means for causing entries in the second queue to be allocated to instructions from the instruction queue based on a demand for said entries by at least one processing unit, said demand updated during processor operation.

31. A processor comprising:
   an allocation unit that assigns identifier numbers to instructions;
   a first storage area coupled to said allocation unit into which a plurality of instructions are stored;
   a second storage area into which instructions from said first storage area are written, said second storage area having a plurality of entries for storing instructions and their identifier numbers; and
   allocation logic that causes entries in the second storage area to be allocated to instructions from said first storage area based on demand for said entries by at least one processing unit, said demand updated d u ring processor operations.

32. A processor comprising:
   an allocation unit that assigns identifier numbers to instructions;
   a first storage area coupled to said allocation unit into which a plurality of instructions are stored;
   a second storage area into which values which identify instructions from said first storage area are stored;
   allocation logic that causes entries in the second storage area to be allocated to instructions from said first storage area based on demand for said entries by at least one processing unit, said demand updated during processor operations.

* * * * *

UNITED STATES PATENT AND TRADEMARK OFFICE
CERTIFICATE OF CORRECTION

PATENT NO. : 7,003,648 B2
APPLICATION NO. : 10/109255
DATED : February 21, 2006
INVENTOR(S) : George Z. Chrysos et al.

Page 1 of 1

It is certified that error appears in the above-identified patent and that said Letters Patent is hereby corrected as shown below:

In column 8, lines 28-29, in Claim 1, delete "numbers:" and insert -- numbers; --, therefor.

In column 9, line 4, in Claim 8, delete "Including:" and insert -- including: --, therefor.

In column 10, line 57, in Claim 23, delete "tree" and insert -- free --, therefor.

In column 12, line 19, in Claim 31, delete "d u ring" and insert -- during --, therefor.

Signed and Sealed this

Eleventh Day of August, 2009

David J. Kappos
*Director of the United States Patent and Trademark Office*